United States Patent Office 3,506,074
Patented Apr. 14, 1970

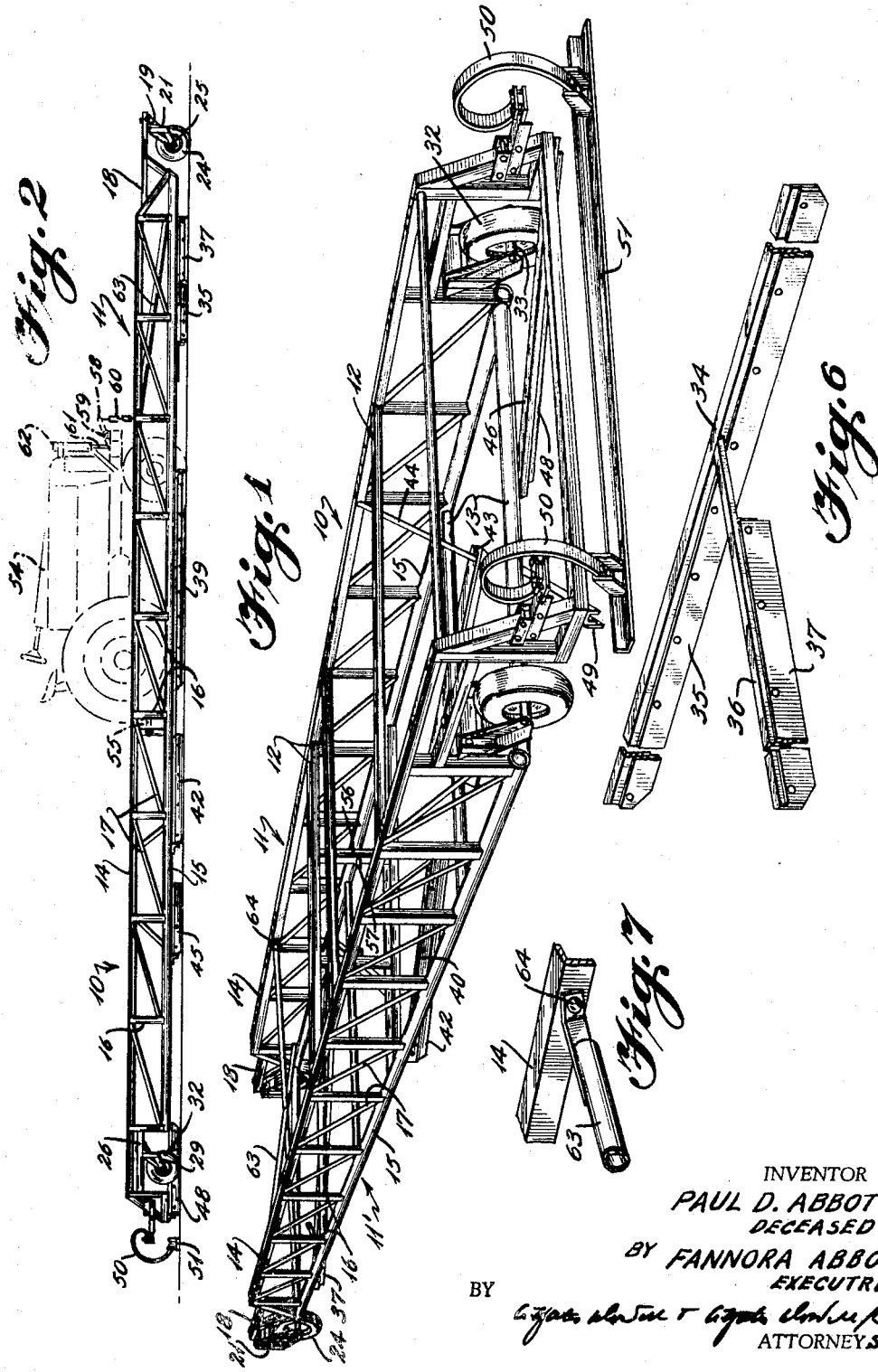

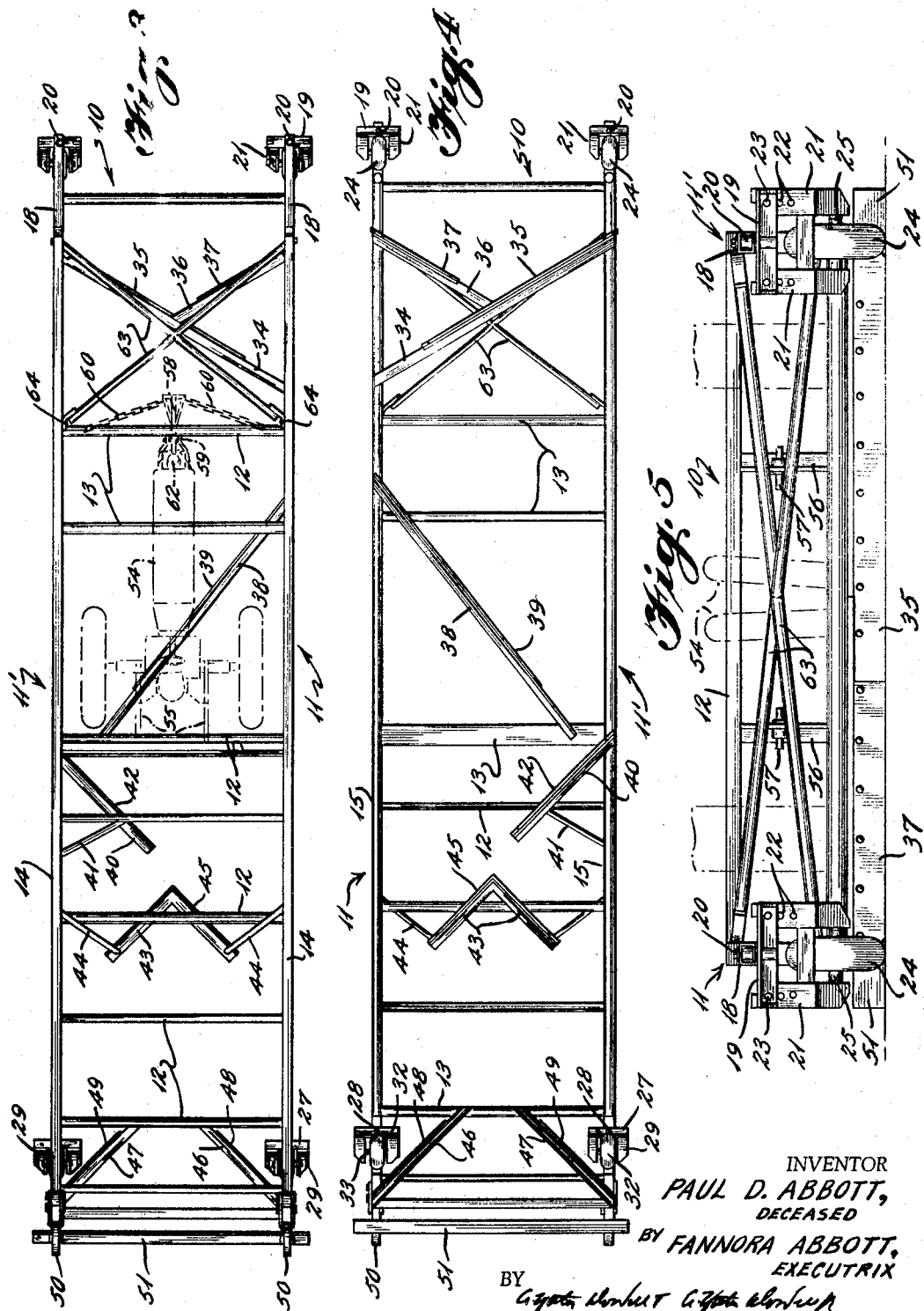

3,506,074
TRACTOR MOUNTED LAND PLANE
Paul D. Abbott, deceased, late of Blytheville, Ark., by Fannora Abbott, executrix, Blytheville, Ark., assignor to Paul Abbott Co., Inc., Blytheville, Ark.
Filed Aug. 10, 1967, Ser. No. 659,818
Int. Cl. E02f 3/12
U.S. Cl. 172—780                        4 Claims

ABSTRACT OF THE DISCLOSURE

Apparatus for working and leveling the earth by means of a plurality of spaced blades mounted on a frame. The frame is supported by a tractor in such a manner that the tractor is entirely surrounded by the frame.

BACKGROUND OF THE INVENTION

Field of the invention

This invention relates to earth working implements having a plurality of blades adapted to engage and level the earth as it passes over the same.

Description of the prior art

Many efforts have been made to grade and level the earth by grading machines of either the self-propelled or trailer type; however, these have not proved satisfactory since the leveling devices which were of sufficient length to perform properly were too difficult to maneuver, particularly at the end of a field, and the implements which were short enough to maneuver conveniently were too short to properly work and level the earth. Also the implements which were self-propelled were too expensive, particularly in view of the short period of time they could be used to prepare an agricultural field for planting.

SUMMARY OF THE INVENTION

The present invention is a relatively long land plane including a box type frame with a plurality of earth engaging blades mounted on the bottom. Portions of the frame are removable to permit a tractor or other propelling vehicle to move into the frame after which the removable portions are replaced. The frame is adapted to be connected to the lift arms at the rear of the tractor and to a front lift at the forward end of the tractor so that when the end of a field is reached the land plane can be elevated out of engagement with the earth to facilitate the turning and maneuvering of the tractor to traverse the field in the opposite direction.

It is an object of the invention to provide a relatively simple strong inexpensive land plane which can be disposed entirely around a propelling vehicle and connected to the lift mechanism thereof to facilitate maneuvering of the vehicle and the land plane.

BRIEF DESCRIPTION OF THE DRAWINGS

FIG. 1 is a rear perspective illustrating one application of the invention.
FIG. 2 is a side elevation to a reduced scale with the propelling vehicle in place.
FIG. 3 is a top plan view.
FIG. 4 is a bottom plan view.
FIG. 5 is an enlarged front elevation.
FIG. 6 is an enlarged fragmentary perspective of a scraper blade assembly per se.
FIG. 7 is an enlarged fragmentary perspective illustrating the removable frame attaching means.

DESCRIPTION OF THE PREFERRED EMBODIMENT

With continued reference to the drawing, the land plane of the present invention includes a frame 10 having a pair of generally parallel box type side members 11 and 11' connected by upper and lower cross members 12 and 13. Each of the side members 11 and 11' includes upper and lower longitudinal stringers 14 and 15 connected by a plurality of generally upright posts 16 and angularly disposed braces 17. Preferably the lower stringers 15 are constructed of tubular elements to impart the desired strength and rigidity to the frame 10.

At the forward end of the side members 11 and 11' a forwardly extending arm 18 is provided on which a transversely extending wheel support 19 is pivotally mounted by a pivot pin 20. A wheel frame 21 having a plurality of spaced openings 22 is adjustably mounted on the wheel support 19 by means of bolts or other fasteners 23. A ground engaging wheel 24 mounted on an axle 25 is secured to the rear end of the wheel frame 21 to function as a caster wheel to support the forward portion of the frame 10 when the device is in use.

At the rearward end of each of the side members 11 and 11' a portion of the lower stringer 15 is removed and a brace 26 is provided which connects the pair of posts 16 adjacent to the rear of the frame. A wheel support 27 is mounted on the brace 26 by a pivot pin 28 so that the wheel support can be turned relative to the frame. A wheel frame 29 is provided having a plurality of openings 30 by means of which the wheel frame can be adjustably mounted on the wheel support 27 by bolts or other fasteners 31. A wheel 32 is mounted on an axile 33 carried by the wheel frame 29.

In order to level and smooth the earth a plurality of blade supports are mounted beneath the frame 10 and are connected to the lower cross members 13 and stringers 15 in any desired manner, as by welding or the like. As illustrated in FIG. 4, a first blade support 34 extends entirely across the bottom of the frame 10 and is adapted to support a blade 35 which extends from the side member 11' to a position spaced from the side member 11. A second blade support 36 extends from the side member 11 to the first blade support 34 to which it is connected. A second blade 37 is attached to the second blade support 36 and extends from the side member outwardly substantially to the center of the frame.

A third blade support 38 is connected at one end to the side member 11 and extends diagonally rearwardly and terminates at one of the lower cross members 13. The blade support 38 supports a third blade 39 which extends substantially from the side member 11 to a point spaced from the end of the blade support 38 and past the longitudinal axis of the frame. A fourth blade support 40 extends diagonally inwardly and rearwardly from the side member 11' substantially to the center axis of the frame where it is supported by a brace 41. A fourth blade 42 is carried by the blade support 40 and extends from the side member 11' substantially to the end of the support 40.

A generally V-shaped fifth blade support 43 is mounted on one of the cross members 13 and the opposite ends of such support are connected by braces 44 to the side members 11 and 11'. A generally V-shaped fifth blade 45 is carried by the support 43 with the point of the blade disposed generally along the longitudinal axis of the frame. At the rear of the frame sixth and seventh blade supports 46 and 47, respectively, are connected at one end to one of the lower cross members 13 in spaced relation to the longitudinal axis of the frame and such blade supports extend outwardly and rearwardly to the side members 11 and 11'. Sixth and seventh blades 48 and 49, respectively, are mounted on the blade supports 46 and 47 and extend substantially the full length of the blade supports and terminate behind the wheels 32.

A pair of leaf springs 50 are mounted on the rear portions of the side members 11 and 11' and such leaf springs curve around and down to a point adjacent to the ground where they are connected to a sweeper bar 51 adapted to trail behind the frame 10 and engage the ground under tension of the springs 50.

In order to propel the frame, a tractor or other propelling vehicle 54 is adapted to be located between the side members 11 and 11' and intermediate the ends thereof. The tractor 54 has a pair of lift arms 55 which are connectable to a pair of posts 56 disposed between a pair of upper and lower cross members and having lift arm receiving pins 57. The lift arms are connected to the pins 57 so that when the lift arms are raised the rear portion of the frame 10 likewise will be raised. At the front of the tractor a lever 58 is pivotally mounted on lugs 59 carried by the frame of the tractor and one end of the lever is connected by chains 60 to the frame 10. The opposite end of the lever 58 is pivotally connected to the piston rod 61 of a fluid cylinder 62 mounted on the front of the tractor so that when the piston rod is extended the chains 60 will be raised to raise the front portion of the frame 10.

In order to support the upper stringers of the front portion of the side members 11 and 11', an X-brace 63 is provided which is removably attached to the side members 11 and 11' in any desired manner as by bolts 64.

In the operation of the device, when it is desired to use the land plane, the X-brace 63 is removed from the frame by removing the bolts 64 and lifting the brace out, after which the tractor 54 is backed into the frame between the side members 11 and 11' and over some of the lower cross members 13, as well as the blade supports 34, 36, and 38 to the position illustrated in FIG. 3. It is noted that the members crossed by the tractor are strong enough to support the weight of the tractor without damage. When the tractor is in position the X-brace 63 is reattached to the frame 10, the lift arms 55 of the tractor are connected to the pins 57, and the chains 60 are connected to the frame. The lift arms 55 and the fluid cylinder 62 then are operated to raise the frame out of engagement with the earth and the tractor is driven to the field to be leveled. When the tractor is in position the frame 10 is lowered so that the blades, 35, 37, 39, 42, 45, 48 and 49, as well as the wheels 24 and 32, are in engagement with the earth. When the tractor is operated in a forward direction, the first and second blades 35 and 37 will sweep earth inwardly to the center of the frame and thereafter the first blade will sweep the earth toward the side member 11. The earth which has been discharged from the blade 35 will be engaged by the blade 39 and swept across substantially to the side member 11' in a rolling spreading action. The earth which is discharged from the blade 39 will be engaged by the blade 42 and swept into the center of the frame where it will be engaged by the V-shaped blade 45 and swept outwardly toward both sides. The blades 48 and 49 will engage the earth which has been discharged from the blade 45 and sweep the earth outwardly of the frame 10. The sweeper bar 51 at the end of the frame will have a final smoothing and leveling action.

It is noted that while the earth is being swept back and forth from one side of the frame to the other, such earth will fill in any holes or depressions and leave the ground smooth and level. When the tractor reaches the end of the field, lift arms 55 and the fluid cylinder 62 are again operated to raise the frame out of engagement with the earth so that the tractor can be turned around in a minimum of space for another traverse of the field, after which the frame can be lowered and the process repeated.

It will be obvious to one skilled in the art that various changes may be made in the described embodiment of the invention without departing from the spirit and scope thereof and therefore the invention is not limited by that which is illustrated in the drawing and described in the specification.

What is claimed is:

1. The combination of an elongated land plane and a propelling vehicle having ground-engaging wheels, lift mechanism located at the front and rear of said vehicle, means on said vehicle for operating said lift mechanism, said land plane comprising an elongated frame having spaced generally parallel side members connected together by a plurality of cross members, said side members being substantially longer than the length of said vehicle and spaced apart a distance greater than the width of said vehicle, a plurality of earth-working blades mounted on said frame and extending downwardly therefrom, said earth-working blades being mounted generally transversely of said frame and spaced longitudinally thereof receive the ground-engaging wheels of said vehicle therebetween, connecting means carried by said frame in a position to be connected to the lift mechanism of said vehicle when the vehicle is located within said frame, whereby said vehicle is located within the frame of said land plane with the lift mechanism of the vehicle connected to the connecting means of said frame so that when the vehicle moves across a field said earth-working blades can be in engagement with the earth and when the vehicle reaches the end of the field the earth-working blades can be raised from engagement with the earth.

2. The structure of claim 1 in which certain of said cross members are selectively removable to permit ingress and egress of the vehicle.

3. The structure of claim 1 including a sweeper member connected to one end of said frame by resilient means.

4. The structure of claim 1 including an adjustable wheel mounted at each end of each of said side members.

References Cited

UNITED STATES PATENTS

| 2,186,658 | 1/1940 | Scheunemann | 172—776 X |
| 2,752,837 | 7/1956 | Parke | 172—273 X |
| 2,786,285 | 3/1957 | Lindbeck | 172—780 |
| 3,047,969 | 8/1962 | Purdy | 172—780 |
| 3,215,448 | 11/1965 | Anderson | 280—400 |

ROBERT E. PULFREY, Primary Examiner

S. C. PELLEGRINO, Assistant Examiner

U.S. Cl. X.R.

172—199